No. 695,569. Patented Mar. 18, 1902.
J. S. LAYTON.
HUB FOR VEHICLE WHEELS.
(Application filed Dec. 7, 1901.)
(No Model.)
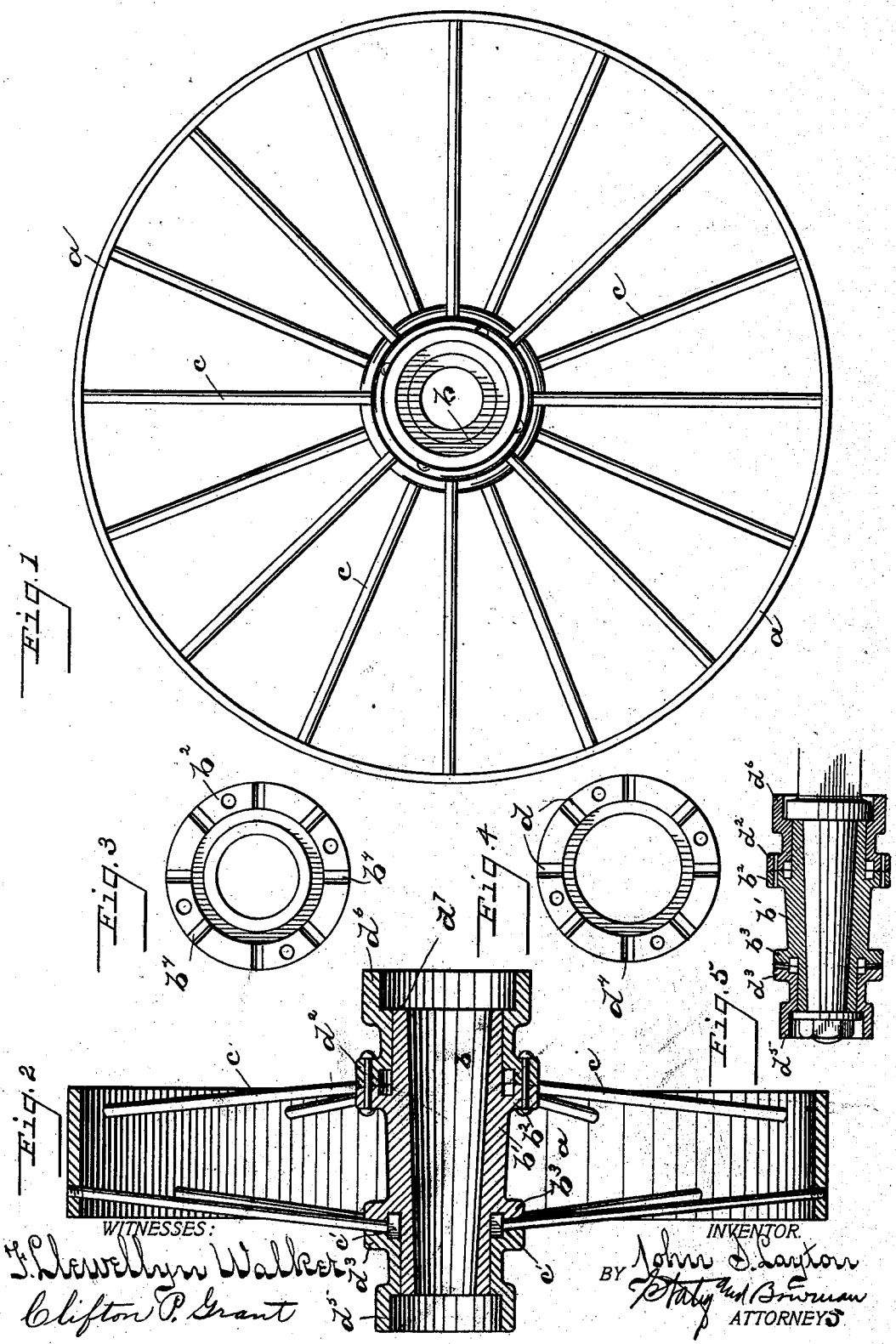

UNITED STATES PATENT OFFICE.

JOHN S. LAYTON, OF SPRINGFIELD, OHIO.

HUB FOR VEHICLE-WHEELS.

SPECIFICATION forming part of Letters Patent No. 695,569, dated March 18, 1902.

Application filed December 7, 1901. Serial No. 85,107. (No model.)

*To all whom it may concern:*

Be it known that I, JOHN S. LAYTON, a citizen of the United States, residing at Springfield, in the county of Clark and State of Ohio, have invented certain new and useful Improvements in Hubs for Vehicle-Wheels, of which the following is a specification.

My invention relates to improvements in hubs for vehicle-wheels; and it more especially relates to the construction of hub for metal wheels.

The object of my invention is to provide a hub of strong and simple construction and one which is made in separable parts, so constructed as to be capable of being readily removed when injured and replaced by new ones.

My invention consists in the constructions and combinations of parts hereinafter described, and set forth in the claims.

In the accompanying drawings, Figure 1 is side elevation of a wheel embodying my invention. Fig. 2 is a vertical sectional view of the same, taken through the center line of the hub. Fig. 3 is an end view of the hub with the end sleeve removed. Fig. 4 is an end view of one of the removable sleeves. Fig. 5 is a sectional view of the hub with the axle therein.

Like parts are represented by similar letters of reference in the several views.

In the said drawings, $a$ represents the rim of the wheel; $b$, the hub; $c$, the spokes. The spokes are screw-threaded at their outer ends and screwed into corresponding openings in the rim. The inner end of each spoke is provided with a head $c'$, which is inserted into the hub and held therein in the manner hereinafter described.

The hub $b$ is constructed in three principal parts, the main body $b'$, having outwardly laterally extending flanges $b^2$ $b^3$, the lateral portions of said flanges projecting toward the respective ends of the hub and forming, with the main body of the hub, an annular groove, which is adapted to receive one side of the heads $c'$ of the spokes. The lateral parts of these flanges $b^2$ $b^3$ have a series of concave notches $b^4$, corresponding with the diameter of the spokes. The outer periphery of the hub, between the respective ends thereof and the flanges $b^2$ $b^3$, is turned off to receive sleeves $d$ and $d'$, which are provided with peripheral and laterally-projecting flanges $d^2$ $d^3$, corresponding to the flanges of the hub and having similarly-notched openings $d^4$, corresponding with the notches $b^4$, to receive the spokes. These sleeves are at their outer ends provided with extended and projecting portions $d^5$ $d^6$, which are adapted to form the point and heel band, respectively, of the hub, each of said sleeves being shouldered, as shown at $d^7$, which shoulders stand flush with the end of the hub proper, so that when the hub is in position on the axle the collar and nut, respectively, of the axle projecting over the joint between the sleeve and body proper assist in holding the parts in their proper positions.

In assembling the wheel the outer ends of the spokes are screwed into the rim to the proper degree, the wheel being trued up and tightened by turning the spokes as desired, thus making substantially a suspension-wheel. The heads of the spokes are crowded into the annular grooves formed by the flanges of the main body of the hub and the sleeves forced into position, after which the flanges are connected together by rivets or any other suitable means. In case of breakage at the point or heel of the hub the part broken can be readily removed and replaced, or in case of damage to the spokes or to the rim by removing the sleeves the spokes can be removed and any injured part replaced. At the same time it will be seen that a very strong construction is secured and one which is particularly adapted for heavy work and capable of ready repair in case of damage.

Having thus described my invention, I claim—

1. In a vehicle-wheel, a hub provided with two peripheral flanges formed integrally with said hub, one on each side of the center thereof, said hubs having reduced ends extending from said flanges, sleeves on each of said reduced ends making the hub, when the sleeves are in place, of substantially the same thickness, said sleeves being provided at their inner ends with peripheral flanges, adjacent to the respective hub-flanges, recesses in the respective hub and sleeve flanges, arranged opposite each other, so as to form inner channels, radial grooves or notches in said flanges, extending from said recesses to the outer periphery of said flanges, spokes provided with heads adapted to fit in said grooves and recesses, said sleeves also having extended projecting portions forming the point and heel bands of said hub and provided with shoulders adapted to stand flush with the ends of the hub proper, between the collar and nut of the axle, substantially as specified.

2. In a vehicle-wheel, the combination of a rim, spokes provided with screw-threaded outer ends connected to said rim and formed at their inner ends with heads, a hub provided with a flange on each side of the center thereof, sleeves on the respective ends of said hub having flanges corresponding to said hub-flanges, each sleeve also having an extended projecting portion forming a shoulder adapted to stand flush with the end of the hub, inner grooves or channels formed in the respective sets of flanges to receive said spoke-heads, a series of openings leading from said channels to the outer peripheries of said flanges to receive said spokes, and means for removably securing said sleeve-flanges to the respective hub-flanges, substantially as specified.

In testimony whereof I have hereunto set my hand this 2d day of December, A. D. 1901.

JOHN S. LAYTON.

Witnesses:
   CHAS. I. WELCH,
   CLIFTON P. GRANT.